United States Patent Office 3,514,419
Patented May 26, 1970

3,514,419
CROSS-LINKED VINYL/DICARBOXYLIC
ANHYDRIDE COPOLYMERS
Brian Benjamin Darlow, Stevenston, and Alexander Ramsay Maund Gibb, Barassie, Troon, Scotland, assignors to Imperial Chemical Industries Limited, London, England, a corporation of Great Britain
No Drawing. Filed Mar. 30, 1966, Ser. No. 538,535
Claims priority, application Great Britain, Apr. 8, 1965, 14,996/65
Int. Cl. C08f 45/24; C08g 45/04
U.S. Cl. 260—29.6                         20 Claims

ABSTRACT OF THE DISCLOSURE

There is provided a cross-linked alternating copolymer of an alpha-beta unsaturated dicarboxylic anhydride and a vinyl monomer, as well as a process for the preparation thereof and aqueous solutions thickened therewith. The copolymer is water-soluble or water-swellable either per se or in salt form. The copolymer is cross-linked by means of an epoxy compound, which may also be unsaturated, and wherein the equivalents of epoxy groups do not exceed 30 per 100 equivalents of the copolymer. Examples include a maleic anhydride/methyl vinyl ether copolymer cross-linked with styrene oxide.

---

This invention relates to cross-linked copolymers of alpha-beta unsaturated dicarboxylic anhydrides and vinyl monomers, and to their preparation. The invention facilitates the preparation of cross-linked copolymeric products which, in salt form, are water-soluble or water-swellable.

Copolymers of alpha-beta unsaturated dicarboxylic anhydrides with vinyl monomers such as, for example, maleic anhydrides-styrene copolymers, have previously been cross-linked by means of a compound having two or three double bonds, during the formation of the copolymer, as described in United Kingdom Pat. No. 715,412, or by reacting the copolymer with a compound containing a plurality of —OH, —SH or —NH groups, as described in United Kingdom Pat. No. 856,320. Although these processes result in cross-linked products of enhanced viscosity, they are difficult to control reproducibly and the products have some undesirable properties. In the former process the cross-linking agents used do not always combine readily with the monomers employed in the reaction and the products usually contain some very highly cross-linked material whose alkali metal salts remain as gelled lumps in aqueous solution. In the latter process the products give salts which are water-insoluble although water-swellable.

It is an object of the present invention to provide evenly cross-linked copolymers of alpha-beta dicarboxylic anhydrides and vinyl monomers.

In accordance with this invention a cross-linked copolymer of an alpha-beta unsaturated dicarboxylic anhydride and a vinyl monomer is cross-linked by means of a compound containing an epoxy group. When a copolymer which is water-soluble or water swellable, either per se or in the form of its salts, is cross-linked with an amount of said epoxy compound not exceeding 30 molar equivalents per 100 molar equivalents of copolymer, the product is one which is water-soluble or water-swellable per se or in salt form. In most cases the salts are much more soluble.

The term "molar equivalents of copolymer" is used herein to means that weight of copolymer which has the same numerical value as the molecular weight of the copolymer repeating unit. For example, in a styrene maleic anhydride copolymer, the molecular weight of the repeating unit is 202 and this, in parts by weight, is one molar equivalent of copolymer. By the term "molar equivalent of epoxy compound" we mean that weight of compound which has the same numerical value as the molecular weight, which contains, on average, one epoxy group.

Examples of epoxy compounds which may be used as cross-linking compounds in the copolymers of the invention include ethylene oxide, propylene oxide, styrene oxide, glycidol, glycidyl methacrylate, glycidaldehyde, allyl glycidyl ether, epichlorhydrin and condensation products of a diphenol with epichlorhydrin (epoxy resins).

The copolymers may, for example, comprise maleic anhydride as the alpha-beta dicarboxylic anhydride and ethylene, isobutylene, styrene or methyl vinyl ether as the vinyl monomer.

The cross-linked copolymers of the invention may be prepared by treating a copolymer of alpha-beta unsaturated dicarboxylic anhydride and vinyl monomer with the cross-linking compound or by effecting polymerisation of these monomers in presence of the cross-linking compound.

When the preformed copolymer is used as the starting material, the polymer and the epoxy compound may be dissolved in a solvent common to both, although good results may be obtained using a liquid medium which dissolves the epoxy compound but which merely swells the copolymer. Using highly reactive epoxy compounds, the cross-linking reaction may proceed at room temperature but it is generally preferable to heat the reaction mixture. With less reactive epoxy compounds the use as catalyst of an acidic substance, such as boron trifluoride, diethyl etherate or a basic substance such as tertiary amine, is advantageous.

With volatile, reactive epoxy compounds the reaction may conveniently be carried out using a fluidised bed comprising a suspension of finely divided copolymer and passing the vaporised epoxy compound through the bed. To obtain a cross-linked polymer having water-soluble salts, the epoxy compound should not exceed 30 molar equivalents per 100 molar equivalents of copolymer but in general it will not be desirable to use more than 10 molar equivalents per 100 molar equivalents of copolymer. However, if the reaction mixture contains any compound which destroys the anhydride or epoxy groups of the reactants such as, for example, water, alcohol or primary amine, a correspondingly higher proportion of the epoxy compound may accordingly be used.

When the epoxy compound is mixed with the vinyl and dicarboxylic anhydride monomers before formation of the copolymer, it is desirable to incorporate also a free radical catalyst to promote polymerisation. Suitable catalysts include, for example, peroxides, hydroperoxides, peresters or aliphatic azocompounds, of which benzoyl peroxide, lauroyl peroxide, cumene hydroperoxide, di-isopropyl peroxydicarbonate or azobisisobutyronitrile are convenient examples. Whilst all the aforespecified epoxy compounds give useful cross-linked products, the products of this form of the process are especially useful when an unsaturated epoxy compounds is used. This is believed to be due to the inclusion of some of this compound in the polymer "backbone" by copolymerisation of its unsaturated group with the other unsaturated components of the reaction mixture to form initially a copolymer "backbone" having some pendant epoxy groups which subsequently cross-link with carboxylic residues of the copolymer. Examples of suitable unsaturated epoxy compounds include glycidyl methacrylate and allyl glycidyl ether.

The monomers and the epoxy compound may be reacted together in bulk or in a solvent medium, but it is especially convenient to carry out the process in a liquid which is a solvent for the monomers and the epoxy compound and a non-solvent for the cross-linked copolymer. The suitability of any particular liquid for this use will depend on the reactants employed but liquid hydrocarbons or chlorinated hydrocarbons such as, for example, benzene, toluene, ethylene dichloride, methylene chloride, cyclohexane, heptane, or mixtures thereof, will be found useful in many instances.

Although using a relatively reactive catalyst the copolymerisation may be effected at ambient temperature, it is generally preferable to carry out the reaction at a temperature in the range 35 to 120° C., and when a volatlie vinyl monomer is used the reaction should be carried out at elevated pressures. It is also preferred to effect copolymerisation in a substantially oxygen-free atmosphere.

The polymerisation may be carried out in a continuous manner, for example, by adding the reactants continuously in one or more streams to a stirred heated reaction vessel and allowing the resultant slurry or suspension of polymer to flow over a dam in the vessel.

If the polymerisation step has been carried out at a relatively low temperature in presence of an epoxy compound, it may be found advantageous to maintain the reaction mixture subsequently at a more elevated temperature to promote cross-linking.

Aqueous solutions prepared from these cross-linked copolymers generally have good shelf-life which may be further enhanced by the inclusion of anti-oxidants, for example, a thiourea, and photostabilisers.

The products of the invention which have water-soluble salts may be used as thickening agents for textile applications, to alter the rheology or viscosity of aqueous solutions of polymer latices, in suspension polymerisation processes and in the formulation of cosmetics, polishes, adhesives, lubricants, insecticides, herbicides, fungicides and paint removers.

The invention is further illustrated by the following examples in which all parts are by weight.

EXAMPLE 1

A mixture of 5.8 parts methyl vinyl ether, 9.8 parts maleic anhydride and 0.1 part azobisisobutyronitrile dissolved in 21 parts benzene, was agitated for 18 hours at 50° C. under an atmosphere of nitrogen in a sealed vessel. The resultant product was isolated in practically theoretical yield as a colourless powder by removal of the solvent under reduced pressure and was the 1:1 alternating copolymer of maleic anhydride and methyl vinyl ether. An examination of its infra-red spectrum showed it to be free of unreacted maleic anhydride.

1.56 parts of this copolymer were dissolved in 10 parts of water containing 0.4 part dissolved sodium hydroxide and the resultant solution was diluted to 196 parts to give a 1% solution of the copolymer, half acid half sodium salt.

The solution had a viscosity of 101 centipoises at 250 C.

A mixture of 1.56 parts of copolymer and 0.05 part styrene oxide in 21 parts benzene, that is, the reactants being in the ratio of 100 to 4 molar equivalents, was stirred under reflux for 6 hours then taken to dryness in a rotary evaporator at 60° C. under a vacuum, finally decreasing to 0.5 mm. The resultant white powder was dissolved in 200 parts water containing 0.4 part sodium hydroxide and this mixture was then diluted further to give a solution containing 0.5% of solids which had a viscosity, measured at 25° C. with the Brookfield LVF viscometer, speed 6, spindle 3, of 9,600 centipoises.

EXAMPLE 2

A mixture of 5.2 parts methyl vinyl ether maleic anhydride copolymer, prepared as in Example 1, and 0.11 part glycidol (that is, a ratio of 100 to 4.5 in molar equivalents) was refluxed in 86 parts of benzene for 2 hours, 0.2 part n-butylamine were added and the mixture was refluxed for a further 2 hours and cooled. 0.27 part of 50% aqueous sodium hydroxide were added with vigorous agitation and the solid product was separated by filtration. This solid was then dissolved in 500 parts water and the solution was diluted further to 0.5% solids. Its viscosity, measured with the Brookfield LVF viscometer, speed 60, spindle 2, was 162 centipoises.

EXAMPLE 3

A mixture of 440 parts maleic anhydride, 310 parts isobutylene, 1800 parts benzene and 1 part azobisisobutyronitrile was stirred at 50° C. for 24 hours in a stainless steel autoclave which had previously been purged with nitrogen. The polymer was isolated by filtration, extracted with ether to remove unchanged maleic anhydride, then dried and ground to pass 60 mesh. It was the 1:1 alterntaing copolymer of maleic anhydride and isobutylene. 15.4 parts of this copolymer were dissolved in 100 parts of water containing 5.6 parts potassium hydroxide and the solution diluted to give 5% concentration of the half acid half potassium salt which had a viscosity of 66.8 cps.

A mixture of 15.4 parts of the copolymer, 0.04 part of a commercial epoxy resin having an epoxy equivalent of 190 (the molar equivalent ratio of the reactants thus being 100 to 0.21) and 0.001 part tri-n-butylamine in 44 parts benzene was stirred and refluxed for 5 hours and then filtered. The product was isolated by filtration and dissolved in sufficient aqueous potassium hydroxide to give a 5% solution of the half acid half potassium salt which had a Brookfield viscosity of 605 cps.

EXAMPLE 4

A mixture of 51 parts styrene, 49 parts maleic anhydride and 0.1 part azobisisobutyronitrile dissolved in 430 parts of benzene was stirred and refluxed in an atmosphere of nitrogen for 30 minutes, whereupon a further 86 parts of benzene were added, and heating and stirring were continued for 24 hours. The product, an alternating copolymer of styrene and maleic anhydride, was isolated by filtration, washed with benzene and ether, and then dried. 10.1 parts of this copolymer were dissolved in 100 parts 2.8% aqueous potassium hydroxide, the solution was diluted with 300 parts of water, its pH was adjusted to 9.0 with small portions of concentrated potassium hydroxide solution and then finally diluted to 2% solids. The resulting solution had a Brookfield viscosity of 49 centipoises with spindle 1 and speed 30.

10 parts of the copolymer were suspended in 86 parts benzene, 0.5 part of a 12% solution of propylene oxide in benzene were added, and the mixture refluxed for 2 hours. After isolating and drying, the polymeric product was converted to a 2% solution of potassium salt of pH 9 as described above. The solution had a Brookfield viscosity of 61 centipoises with spindle 1 and speed 30. The ratio of reactants in molar equivalents was 100 to 2.

The reaction with propylene oxide was repeated using 2.5 parts 12% propylene oxide, that is, a molar ratio of 100 to 10. A 2% solution of the potassium salt at pH 9 had the following Brookfield viscosities using spindle number 2.

| Speed: | Viscosity (centipoises) |
|---|---|
| 6 | 545 |
| 12 | 478 |
| 30 | 418 |
| 60 | 373 |

The reaction with propylene oxide was repeated again, using 5 parts 12% propylene oxide, that is, a molar ratio of 100 to 20. A 2% solution of the potassium salt at pH 9 had the following Brookfield viscosities using spindle number 4:

| Speed: | Viscosity (centipoises) |
|---|---|
| 6 | 9,100 |
| 12 | 6,150 |
| 30 | 3,680 |
| 60 | 2,480 |

EXAMPLE 5

A mixture of 51 parts styrene, 49 parts maleic anhydride, 0.1 part azobisisobutyronitrile and 1.5 parts styrene oxide in 430 parts of benzene was stirred and refluxed in an atmosphere of nitrogen for 30 minutes. A further 86 parts of benzene were added and heating and stirring was continued for a further 24 hours. A solid polymeric product was formed and filtered off. A 2% solution of potassium salt with pH 9, prepared from this product as described in Example 4, had a Brookfield viscosity of 80 centipoises.

EXAMPLE 6

A solution of 250 parts maleic anhydride and 2.5 parts azobisisobutyronitrile in 1300 parts of benzene was placed in a stainless steel pressure vessel which was purged first with nitrogen and then with ethylene. The solution was stirred and heated at 80° C., and pressurised to 300 p.s.i.g. with ethylene. After 30 hours the vessel was cooled, purged with nitrogen and the product, an alternating copolymer of ethylene and maleic anhydride, was isolated by filtration. 12.5 parts of the washed and dried copolymer were dissolved in a solution of 5 parts potassium hydroxide in 100 parts of water, the pH was adjusted to 9 by further small addition of concentrated potassium hydroxide solution and the final volume diluted to give a 10% solution of solids. Its viscosity at 25° C. was 10.7 centipoises. 21 parts of this copolymer were suspended in a solution of 1 part styrene oxide in 160 parts of benzene and the mixture refluxed for 6 hours. The product was recovered by filtration. The molar ratio of copolymer to styrene oxide in the product was 100 to 5. A 10% solution of the potassium salt, pH 9, prepared as described above, had a Brookfield viscosity of 148 centipoises.

EXAMPLE 7

A mixture of 9.8 parts maleic anhydride, 5.8 parts methyl vinyl ether, 0.15 part lauroyl peroxide and 26 parts benzene was agitated at 50° C. for 18 hours in a sealed vessel under an atmosphere of nitrogen. The copolymer, obtained in quantitative yield, was dried, 1.56 parts were dissolved in 100 parts 0.4% aqueous sodium hydroxide and the resulting solution was diluted to 400 parts. The solution had a Brookfield viscosity of 291 centipoises as measured with spindle number 1 and speed 6.

The reaction was repeated using 9.8 parts maleic anhydride, 5.8 parts methyl vinyl ether, 0.15 part lauroyl peroxide, 26 parts benzene and 0.25 part styrene oxide, that is, with a molar ratio of 2.1 styrene oxide units to 100 maleic anhydride/methyl vinyl ether units present in the reaction mixture. A solution of the sodium salt, prepared as described above for the unmodified copolymer, had the following Brookfield viscosities using spindle 4:

| Speed: | Viscosity (centipoises) |
|---|---|
| 6 | 12,900 |
| 12 | 8,750 |

EXAMPLE 8

A cross-linked copolymer was prepared by a process as described in Example 7 using a mixture of 9.8 parts maleic anhydride, 5.8 parts methyl vinyl ether, 0.15 part lauroyl peroxide, 26 parts benzene and 0.25 part glycidol. A solution of the sodium salt prepared as described in Example 7 had the following Brookfield viscosities using spindle 4:

| Speed: | Viscosity (centipoises) |
|---|---|
| 6 | 10,600 |
| 12 | 7,700 |

EXAMPLE 9

A cross-linked copolymer was prepared as in Example 8 except that 1 part glycidyl methacrylate was used in the reaction mixture in place of the glycidol. A solution of the sodium salt, prepared as described in Example 7, had a Brookfield viscosity of 88,900 centipoises with spindle 4 and speed 6.

EXAMPLE 10

To a suspension of 20 parts of a methyl vinyl ether maleic anhydride copolymer in 80 parts of toluene was added 0.4 part epichlorhydrin and 0.15 part boron trifluoride diethyl etherate. The mixture was stirred and refluxed for 5 hours, cooled, and the solid polymer product was filtered off and dried under vacuum.

Fifteen parts of the product were dissolved in hot water. The solution was titrated to pH 7 with 4.6 N sodium hydroxide, then diluted to give a concentration of 5% with respect to the copolymer. The viscosity of the solution was 34,000 cps. measured with the Brookfield LVT viscometer spindle 4, speed 6. A solution prepared in the same way from the unmodified copolymer had a viscosity of 750 cps.

What we claim is:

1. A cross-linked alternating copolymer of an alpha-beta unsaturated dicarboxylic anhydride and a vinyl monomer, which copolymer is water-soluble or water-swellable per se or in salt form, cross-linked by means of an epoxy compound, wherein the molar equivalents of epoxy groups do not exceed 30 per 100 molar equivalents of copolymer.

2. A cross-linked copolymer as claimed in claim 1 wherein the compound containing the epoxy group is an unsaturated epoxy compound.

3. A cross-linked copolymer as claimed in claim 1 wherein the compound containing an epoxy group comprises ethylene oxide, propylene oxide, styrene oxide, glycidol, glycidyl methacrylate, glycidaldehyde, allyl glycidyl ether, epichlorhydrin, or a condensation product of a diphenol with epichlorhydrin.

4. A cross-linked copolymer as claimed in claim 1 in the alpha-beta dicarboxylic anhydride constituent comprises maleic anhydride.

5. A cross-linked copolymer as claimed in claim 1 wherein the alpha-beta dicarboxylic anhydride constituent ene, isobutylene, styrene or methyl vinyl ether.

6. A process for the preparation of cross-linked alternating copolymers as claimed in claim 1 wherein an alternating copolymer of an alpha-beta unsaturated dicarboxylic anhydride and a vinyl monomer, which copolymer is water-soluble or water-swellable per se or in salt form, is reacted with an epoxy compound, the amount of epoxy compound being such that the molar equivalents of epoxy groups on the resulting cross-linked copolymer do not exceed 30 per 100 molar equivalents of copolymers.

7. A process as claimed in claim 6 wherein the copolymer and the epoxy compound are dissolved in a solvent common to both or in a liquid medium which dissolves the epoxy compound and swells the copolymer.

8. A process as claimed in claim 6 wherein the treatment is carried out in presence of a catalyst comprising an acidic or a basic substance.

9. A process as claimed in claim 8 wherein the catalyst comprises boron trifluoride diethyl etherate, n-butylamine or tri-n-butylamine.

10. A process as claimed in claim 6 wherein the compound containing an epoxy group comprises ethylene oxide, propylene oxide, styrene oxide, glycidol, glycidyl methacrylate, glycidaldehyde, allyl glycidyl ether, epichlorhydrin, or a condensation product of a diphenol with epichlorhydrin.

11. A process for the preparation of cross-linked alternating copolymers as claimed in claim 1 wherein the alpha-beta unsaturated dicarboxylic anhydride and a vinyl monomer are copolymerised in presence of an amount of an epoxy compound wherein the molar equivalents of epoxy groups on the resulting cross-linked copolymer do not exceed 30 per 100 molar equivalents of copolymer.

12. A process as claimed in claim 11 wherein the copolymerisation is effected in presence of a free radical catalyst.

13. A process as claimed in claim 12 wherein the catalyst comprises a peroxide, a hydroperoxide, a perester or an aliphatic azocompound.

14. A process as claimed in claim 13 wherein the catalyst comprises benzoyl peroxide, lauroyl peroxide, cumene hydroperoxide, di-isopropyl peroxydicarbonate or azobisisobutyronitrile.

15. A process as claimed in claim 11 wherein the process is carried out in a liquid which is a solvent for the monomers and the epoxy compound and a non-solvent for the cross-linked copolymer.

16. A process as claimed in claim 11 wherein the reaction temperature is in the range 35–120° C.

17. A process as claimed in claim 11 wherein the vinyl monomer is volatile and tre reaction is carried out at elevated pressure.

18. A process as claimed in claim 11 wherein the reaction is carried out in a substantially oxygen-free atmosphere.

19. A thickening agent comprising an aqueous solution of a cross-linked copolymer as claimed in claim 1.

20. A thickening agent as claimed in claim 19 which also contains an antioxidant or a photostabiliser.

References Cited

UNITED STATES PATENTS

| | | | |
|---|---|---|---|
| 3,301,920 | 1/1967 | Price | 260—837 |
| 3,317,457 | 5/1967 | Zimmerman et al. | 260—837 |
| 3,316,195 | 4/1967 | Grosner et al. | |
| 2,533,635 | 12/1950 | Seymour. | |
| 2,848,433 | 8/1958 | Eirich | 260—837 |
| 3,346,443 | 10/1967 | Elmer | 260—837 |
| 3,417,045 | 12/1968 | Henson et al. | 260—837 X |

MURRAY TILLMAN, Primary Examiner

H. ROBERTS, Assistant Examiner

U.S. Cl. X.R.

260—836, 837, 78.5, 33.6